United States Patent [19]
Schipper

[11] Patent Number: 5,669,061
[45] Date of Patent: Sep. 16, 1997

[54] AUTOMATIC CELLULAR PHONE TRACKING

[75] Inventor: John F. Schipper, Palo Alto, Calif.

[73] Assignee: Trimble Navigation Limited, Sunnyvale, Calif.

[21] Appl. No.: 292,856

[22] Filed: Aug. 19, 1994

[51] Int. Cl.⁶ .................................................. H04Q 7/22
[52] U.S. Cl. ........................... 455/429; 455/440; 342/357
[58] Field of Search .................. 455/33.1, 33.2, 455/33.3, 33.4, 53.1, 54.1, 54.2, 56.1, 70; 379/59, 60; 342/457, 357

[56] References Cited

U.S. PATENT DOCUMENTS

| | | | |
|---|---|---|---|
| 5,055,851 | 10/1991 | Sheffer | 455/54.1 X |
| 5,208,756 | 5/1993 | Song | 455/54.1 X |
| 5,214,789 | 5/1993 | George | 455/33.2 |
| 5,235,633 | 8/1993 | Dennison et al. | 455/33.2 X |
| 5,390,339 | 2/1995 | Bruckert et al. | 455/33.2 |
| 5,396,540 | 3/1995 | Gooch | 379/59 |
| 5,396,647 | 3/1995 | Thompson et al. | 455/33.2 |
| 5,418,537 | 5/1995 | Bird | 342/357 |
| 5,483,664 | 1/1996 | Moritz et al. | 455/33.2 X |
| 5,546,445 | 8/1996 | Dennison et al. | 379/60 |

*Primary Examiner*—Reinhard J. Eisenzopf
*Assistant Examiner*—Philip J. Sobutka
*Attorney, Agent, or Firm*—John Schipper

[57] ABSTRACT

A system for tracking the location of, and for providing cellular telephone handoff for, a mobile cellphone user as the cellphone user moves from one cellzone to another. A boundary curve B12 between a first cellzone and an adjacent second cellzone is defined in an electronic map by an equation $h_{B12}(x,y,z)-K12=0$ for points with spatial location coordinates $(x,y,z)$ lying on the curve B12, where K12 is a selected constant. First and second quasi-boundary curves QB1 and QB2, lying within the first and second cellzones, respectively, are defined, where each point on the curve QBi $(i=1,2)$ lies at a selected distance di from the boundary curve B12. A region CR12 of points lying between the quasi-boundary curves QB1 and QB2 and including the boundary curve B12 is defined. The present location of the cellphone user is determined using a Satellite Positioning System (SATPS) such as GPS or GLONASS. Cellular telephone service for the cellphone user is provided (1) by a first cellular service provider or (2) by a second cellular service provider, when the cellphone user is located (1) within the first cellzone, not including the overlap region CR12, or (2) within the second cellzone, not including the overlap region CR12. When the cellphone user enters the region CR12 from within the first cellzone and proceeds toward the boundary curve B12, the system carried by the cellphone user notifies at least one of the first and second cellular service providers that the cellphone user is about to leave the first cellzone and about to enter the second cellzone. The system may be extended (1) to determine the approximate location of a missing vehicle and (2) to dynamically change the boundary curves of at least one cellzone to relieve cellular service overloading that occurs within that cellzone.

22 Claims, 6 Drawing Sheets

FIG. 6 in U.S. Pat. No. 4,949,268. A combination of three or more

AUTOMATIC CELLULAR PHONE TRACKING

FIELD OF THE INVENTION

This invention relates to determination of which service zone a roving or mobile cellular phone has entered and automatic transmission of this information to a cellular phone service provider.

BACKGROUND OF THE INVENTION

The number of cellular phone users in the U.S. is now estimated at about 17 million and continues to grow at a rate exceeding 20 percent per year. Most of this growth in use has occurred in and around cities and towns with populations of 20,000 or more and has caused saturation of the channels available for cellular communication in many of these urban areas. Cellular service zones, referred to herein as "cellzones" for convenience, each servicing about 800 cellular telephone communications, have decreased in size from several miles in diameter to a few hundred meters in diameter as the density of cellphone users has increased apace in urban and suburban areas.

A cellphone subscriber will typically register use of a cellphone in a home cellzone and will temporarily re-register in one or more nearby cellzones if the subscriber makes or receives cellphone calls in these other cellzones. However, even where the cellphone subscriber is already registered in one or more nearby cellzones, the operator of any cellzone will typically be unaware of the presence of this subscriber in this cellzone, unless this subscriber has either recently requested cellular service in this zone or has somehow notified the operator that the subscriber is currently present in this zone. Knowledge of the number of cellphone subscribers currently in a given cellzone, who are not all active users of the cellular phone service at any given moment, may allow the service operator to rationally plan its present provision, and future expansion, of cellular service to accommodate the increasing demands.

A personnel locator system is disclosed in U.S. Pat. No. 3,439,320, issued to Ward. Each person carries a sensor/transmitter that emits a unique frequency whenever that person enters any one of a plurality of selected areas in a facility, with each such area having a receiver that receives this signal and transmits this information to a central processor. The processor keeps track of the movements of each person from one selected area to another area so that, at any given time, the processor can identify the selected area a given person now occupies. This approach is limited to a relatively small geographic area and to a relatively small number of covered persons.

Serrano et al disclose a microprocessor-controlled interface for a cellular phone system to be carried in a vehicle, in U.S. Pat. No. 4,718,080. A telephone handset communicates with the cellular transceiver along a bus and through the microprocessor that interprets bus logic signals, including voice and data signals. No integration is disclosed of the on-board cellular system with any instrument that reports vehicle operating information upon command received from a remote site.

U.S. Pat. No. 4,797,671, issued to Toal et al, discloses a motor vehicle locator system that indicates the location of a parked vehicle within a controlled area, such as a large parking lot. Each parked vehicle carries a receiver and audio/visual signal emitter. The receiver responds only to receipt of a signal having a unique frequency and causes the emitter to emit an audible or visually perceptible signal that indicates the present location of the parked vehicle. This approach requires that the vehicle be located within a controlled area of modest size, probably no larger than a city block.

Ando et al, in U.S. Pat. No. 4,837,700, disclose method and apparatus for processing and displaying the present location of a road vehicle, using a GPS receiver to provide data on vehicle location. This approach provides continuous information on vehicle location and vehicle orientation or vehicle movement vector based upon sensing the Earth's local geomagnetic field direction. An angular rate sensor determines, and optionally displays, the angular rate of change of vehicle orientation, and an odometer determines the distance the vehicle has moved over some predetermined time interval. The present vehicle location can be displayed graphically on an electronic map carried within the vehicle, with a sequence of maps being used to display the changing vehicle location. Map size can also be increased or decreased, and the displayed map can be automatically scrolled as vehicle position changes. A keyboard is available for entering instructions into a controller or processor. A reference location can be entered into the system, and vehicle location can be determined relative to this reference location. The location data can be stored if these data are acceptable and can be dumped into a bit bucket if these data are not acceptable.

In U.S. Pat. No. 4,924,402, Ando et al disclose a more detailed approach for determining and graphically displaying vehicle location using a GPS. This system uses a magnetic field sensor, an angular velocity sensor and a travel distance sensor together with GPS data and stores maps together with numerical data that describe useful features of the local terrain. Sensing of vehicle distance traveled and directional turns made is intended to be sufficiently accurate that the map displays the location of the vehicle relative to road intersections (i.e., approaching, passing through, turning, etc.). With reference to FIGS. 16–17, 22, 27–28 and 30 of the Ando et al patent, the invention appears to put a premium on receiving GPS data that are accurate to within one meter.

A paging system with paging request receivers that respond or are controlled differently, depending upon receiver location, is disclosed by Vrijkorte in U.S. Pat. No. 4,943,803. Using "angle modulation" whose operation is not explained, the paging request receiver is said to pick out the strongest transmission control signal from among simultaneously transmitted control signals and to respond to this signal, if the signal received includes the receiver's predetermined address code. The receiver goes into a "sleeper" mode if no signals specifically addressed to that receiver are received within a selected time interval. The receiver is activated for receiving a control message by receipt of a receiver activation signal that may vary with the geographic zone presently occupied by the receiver.

Nishikawa et al disclose a land vehicle navigation system in U.S. Pat. No. 4,949,268. A combination of three or more GPS satellites is selected, from among all available GPS satellites, that provides the best vehicle location data. Here, a figure of merit used is minimum position dilution of precision ("PDOP") associated with the data received from a given group of GPS satellites. This approach seeks to account for the possibility that one or more buildings or other structures of relatively great height may preclude satellite visibility. The height of the structures in that area may be stored as part of a map in a GPS processor on board the land vehicle whose location is to be determined. The on-board system seeks combinations with the highest number of satellites visible, then works from these combinations to minimize the PDOP or a similar figure of merit for GPS position data.

Scribner et al disclose a vehicle tracking system that records, but does not transmit, the location of a vehicle whenever one or more predetermined events occurs in U.S. Pat. No. 5,014,206. The vehicle carries sensors that respond to occurrence of a predetermined event and carries a GPS or LORAN navigational system that receives vehicle location information, such as longitude and latitude. This vehicle location information is stored in a memory on board the vehicle only when one or more of the predetermined events occurs. The vehicle location information is assumed to be read out periodically when the vehicle returns to a home base.

In U.S. Pat. No. 5,043,736, Darnell et al disclose use of a combined cellular telephone and GPS portable receiver system that provides latitude and longitude coordinate information for the receiver. The GPS receiver has a modem and transmitter connected thereto that transmit its position to an accessible cellular phone, which in turn notifies a stationary base unit of the location of the GPS receiver. The base unit graphically displays the present location of the GPS receiver. This patent does not disclose determination of the location of the cellular telephone with reference to a prescribed cellzone boundary.

On-board navigation apparatus, to be carried on a vehicle to compare present and immediate-past locations as determined from GPS data, is disclosed by Odagawa et al in U.S. Pat. No. 5,087,919. A map containing coordinates for all roads in a region of the Earth's surface is stored electronically in a navigation system on board the vehicle, as part of a "map" of the region. The navigation system apparently assumes that the vehicle stays on one of the roads. Using the continuously arriving GPS data, the system searches for the nearest road segment that is consistent with these data to determine present location of the vehicle. Only latitude and longitude data are needed here so that fewer than four satellites may be used to determine the present location. Elevation data are provided as part of the road description stored in the navigation system. This system would not work well for a vehicle, such as an off-road land vehicle or a marine vessel, that has no fixed system of roads or paths to follow. This approach would not be particularly useful in determining the location of a stolen vehicle, unless the thief could be relied upon to stay on the conventionally describable roads.

Lojack Corp. of Dedham, Massachusetts has demonstrated a vehicle location system using triangulation of radio signals transmitted from the vehicle by a large number of receivers that are strategically positioned around a community. The vehicle transmitter is remotely activated by a signal broadcast from elsewhere.

Selby, in U.S. Pat. No. 4,876,738, and Comroe et al, in U.S. Pat. No. 5,054,110, disclose a registration procedure for a mobile cellular telephone user with one or more cellular phone service facilities that service zones in which the user operates. Where telephone contact with a cellphone user, who has not registered, is sought, the present location of this user must first be determined by area-wide paging. Registration of a cellphone user in a particular zone does not indicate that this user is presently in that zone.

Use of signals broadcast by a plurality of fixed site radio transmitters and received by a mobile cellphone user, to determine the user's present location by signal strength triangulation, is disclosed in U.S. Pat. No. 4,907,290, issued to Crompton. Location of the mobile receiver by this means does not indicate which, if any, cellular service provider can provide cellular communications service, and the typical location inaccuracy of this approach is probably many tens of meters.

Lee, in U.S. Pat. Nos. 4,932,049 and 5,067,147, discloses use of a main antenna in each cell zone plus several subsidiary antennas located on the cell zone boundaries or elsewhere to determine when a mobile cellular phone user has left that cell zone. Signal strengths from the mobile cellular phone are measured at each antenna in the cell zone and are compared with one or more reference sets of signal strengths to determine when handoff to an adjacent cell zone is appropriate.

U.S. Pat. No. 4,966,715, issued to Marui et al, discloses a mobile cellular phone system in which the strength of a signal received from a mobile cellular user are compared against first and second threshold values. If the signal strength is less than the first threshold value but greater than the second threshold value, a cell zone boundary is being approached. If the signal strength is less than the second threshold value, the mobile cellular user is determined to have crossed the cell zone boundary.

A method of predicting cell zone handoffs for a satellite-based cellular phone communications system is disclosed by Bertiger et al in U.S. Pat. No. 5,161,248. The geographic location of a mobile cellular phone user within a cell zone is determined, by means not discussed in detail. For a mobile user near a cell zone boundary, bit error rates for the satellite signals are computed and used to enhance the accuracy of the mobile user's calculated location.

In U.S. Pat. No. 5,175,867, issued to Wejke et at, a system for neighbor-assisted cell zone handoff is disclosed. A cellular service provider in a first cell zone measures the strength of signals received from a mobile cellular user that is moving in a second, adjacent cell zone. When this signal strength rises above a selected threshold, the first cell zone service provider requests handoff of the mobile user from the second cell zone to the first cell zone.

Bamburak discloses a location registration system for cellular mobile phones and other personal communicators in U.S. Pat. No. 5,197,092. The personal communicator includes means for call forwarding and updating thereof, stored at a central station through which calls made to the communicator are directed. This patent includes a useful discussion of cellular phone location registration approaches.

A method of controlling cellular mobile phone handoff by monitoring the Rayleigh multipath fading of the strength of a signal transmitted by a mobile cellphone to estimate the velocity of the cellphone is disclosed by Kanai in U.S. Pat. No. 5,239,667. This velocity estimate is used to estimate a difference between a reference signal strength level and the present signal strength level. When this difference reaches a selected threshold, cellphone handoff is implemented.

U.S. Pat. No. 5,241,685, issued to Bodin et al, discloses a load sharing technique for a mobile cellular phone system. Adjacent cellphone cell boundaries are defined in terms of relative signal strength. Thresholds for handoff, stated in terms of relative signal strengths, are dynamically adjusted in times of heavy communication traffic to lower the load on an overloaded cell and to increase the load on adjacent, less heavily loaded cells, by decreasing the area covered by the most overloaded cell.

Bissell et al, in U.S. Pat. No. 5,243,645, disclose a system for automatic forwarding of phone calls to a mobile recipient of such calls. When, or if, the recipient engages in a commercial transaction, such as use of a credit card or of an Automatic Teller Machine, that indicates the recipient's present location, this present location information is communicated to a central database. Phone calls are then automatically forwarded to the most recently communicated "present location" of the recipient. If the recipient has not engaged in such a commercial transaction, no present location information is available for call forwarding.

Koma et al disclose a cellular phone system with time display in which the mobile cellphone user continually receives a signal identifying the area code of the present cellzone of the user, in U.S. Pat. No. 5,258,964. If an Area Code boundary is crossed and this crossing involves a time zone change, this time change is entered manually initially and stored for possible future use. if this zone crossing occurs again. However, no details are disclosed for determining the present location of the cellphone or the Area Code zone in which the cellphone is located.

A mobile cellular phone registration system is disclosed in U.S. Pat. No. 5,289,527, issued to Tiedemann. A mobile user registers in a new cell whenever the user's distance from a selected location in the cell of present registration is greater than a threshold distance. This appears to require that all cells be of similar shape (e.g., regular hexagons) and size and does not necessarily provide an accurate indication of when the mobile user has crossed a cell boundary line. Relative range measurements are also used to determine the proper cell zone in U.S. Pat. No. 4,667,202, issued to Kammerlander et al.

In U.S. Pat. No. 5,293,643, Israelsson discloses a method for determination of handoff between two mobile cellular phone cell zones. When handoff from a first cell zone to another cell zone is allowed but not required, the correlation of a signal strength vector, whose vector components are the measured strengths of signals received from each of two or more adjacent cells at the mobile unit, with two or more reference signal strength vectors is calculated. These correlation values are compared to determine when, and to which cell zone, handoff is required. This approach requires careful determination of correlation threshold values for several representative locations within several cell zones, and adjustment of one or more cell zone boundaries may require remeasurement of many of these threshold values.

Sawyer et al, in U.S. Pat. No. 5,307,400, disclose a mobile cellular phone call routing routing approach that relies upon voluntary registration of the mobile user in a visited cell zone that is not the home cell zone. After voluntary registration in the visited cell is completed, the cellular service provider for the visited cell advises the home cell zone of this registration. The home cell zone cellular service provider then temporarily routes all phone calls for the mobile user to the visited cell zone cellular service provider. A somewhat similar approach is disclosed in U.S. Pat. No. 4,972,456, issued to Kaczmarek et al.

These patents disclose use of GPS or radiowave technology for determination of location or orientation of a person or vehicle continuously or at discrete times, without regard to which of several geographically defined zones the person or vehicle may have last entered. What is needed is a system that automatically tracks the movement of a vehicle or person, such as a cellphone subscriber, who moves from one cellzone to another, irrespective of whether a given cellphone subscriber is actively using cellular phone service, as a boundary is crossed between two adjacent cellzones. Preferably, this system should accurately determine which cellzone a given subscriber currently moves in and should be flexible enough to cover cellzones of arbitrary and changeable sizes, shapes and densities.

SUMMARY OF THE INVENTION

These needs are met by the invention, which provides a system that may be local or global for automatically tracking the movements of a plurality of cellphone subscribers from one cellzone to another. The invention might be characterized as "Where Am I?". A cellphone system carried by a subscriber (or by the subscriber's vehicle) includes a Satellite Positioning System (SATPS) antenna and receiver/processor and carries a transmitter that uses a preselected frequency not within the cellular transmission bands. The SATPS receiver/processor includes an electronic map with the coordinates of the boundary curves of each cellular exchange or cellzone within a selected region R, which region can be a portion or all of a town, city, county, state, country or continent.

Each time the subscriber crosses such a boundary curve, from a first cellzone to a second cellzone, a cellular telephone service provider in one or both of these cellzones is advised of the subscriber's new cellzone location. When a telephone caller seeks to reach a cellular phone subscriber, the initial inquiry is directed to a central cellular station, such as a mobile cellular telephone switching office (MCTSO) that communicates with all cellular phone exchanges within the region R. The central MCTSO transmits or broadcasts an inquiry and is informed of the cellzone in which the subscriber is presently located. The central MCTSO need not separately inquire about the present location of a given subscriber or estimate the subscriber's present location from recent cellphone calls, if any, made or received by the subscriber. Because each of two cellzones service providers is aware of the subscriber's present cellzone, loss or compromise of this information by one of these cellzone service providers does not preclude response to the central MCTSO's inquiry by the other cellzone service provider.

The central MCTSO receives a response, identifying the cellzone where the subscriber is presently located, and patches the call through from the telephone caller to the subscriber in this cellzone. This system can also be used to automatically provide a cellular system with information on the present cellzone location of a vehicle that has been moved without authorization, without requiring the vehicle owner to first inquire about the missing vehicle's location. The time a vehicle last crossed a boundary between two adjacent cellzones can also be noted, to provide a time stamp indicating the relative "staleness" of this cellzone information. The cellzone in which the vehicle is presently located is identified. In an urban setting, the cellzones may be relatively small, as small as a few urban blocks on a side.

This system can also be used to relieve a situation in which a severe overload in cellular service demand has developed in a given cellzone, by dynamically changing the cellzone boundary curve(s) between the given cellzone and at least one adjacent cellzone, based on the relative cellzone loads.

DETAILED DESCRIPTION OF THE INVENTION

Figure 1:
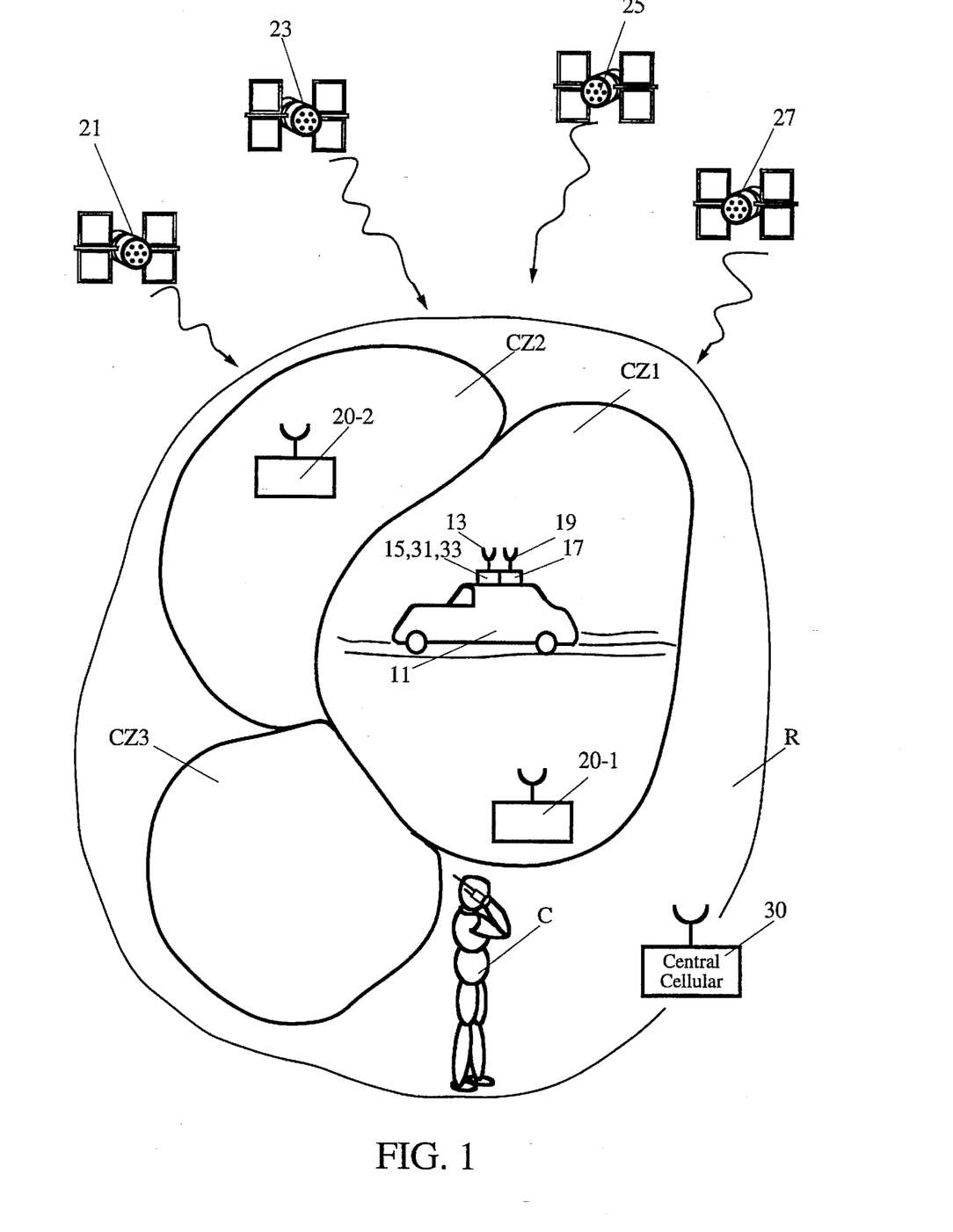
FIG. 1 illustrates use of the invention in a cellular communications environment.

In FIG. 1, a land or marine vehicle 11 or other unit carrying a mobile cellular telephone user, moving within a cellzone CZ1 contained in a larger region R, carries a Satellite Positioning System (SATPS) antenna 13 and associated SATPS receiver/processor 15 that receive and analyze SATPS signals transmitted by a plurality of SATPS satellites 21, 23, 25 and 27. An SATPS signal received by the antenna 13 and receiver/processor 15 is first identified according to the SATPS satellite that transmitted this signal. The pseudorange or (uncorrected) measured distance from this satellite to the vehicle 11 is determined by determination of the time elapsed from signal transmission by the satellite to signal receipt by the antenna, using well known principles of analysis for satellite-based location determination by a Global Positioning System (GPS) or a Global Orbiting Navigational Satellite System (GLONASS). The GPS and GLONASS location determination systems are discussed below in some detail.

If, as here, the antenna 13 continuously receives SATPS signals from a plurality of satellites, the associated receiver/processor 15 can determine the present location coordinates and time of observation of the antenna when these signals are received. The vehicle or mobile cellphone user 11 carries a cellular telephone module 17, including a cellphone antenna/transmitter 19 that can communicate with cellular phone service providers 20-1 and 20-2 for the cellzones CZ1 and CZ2, respectively. The vehicle also carries a microcomputer 31 and associated memory 33, which can be part of the receiver/processor 15, that is provided with an electronic map of the region R in which the vehicle operates. This electronic map deliniates the boundaries of a plurality of nearby cellzones CZ1, CZ2, CZ3, etc. in the region R, using SATPS-defined cellzone boundary coordinates that are part of the electronic map.

Figure 2:
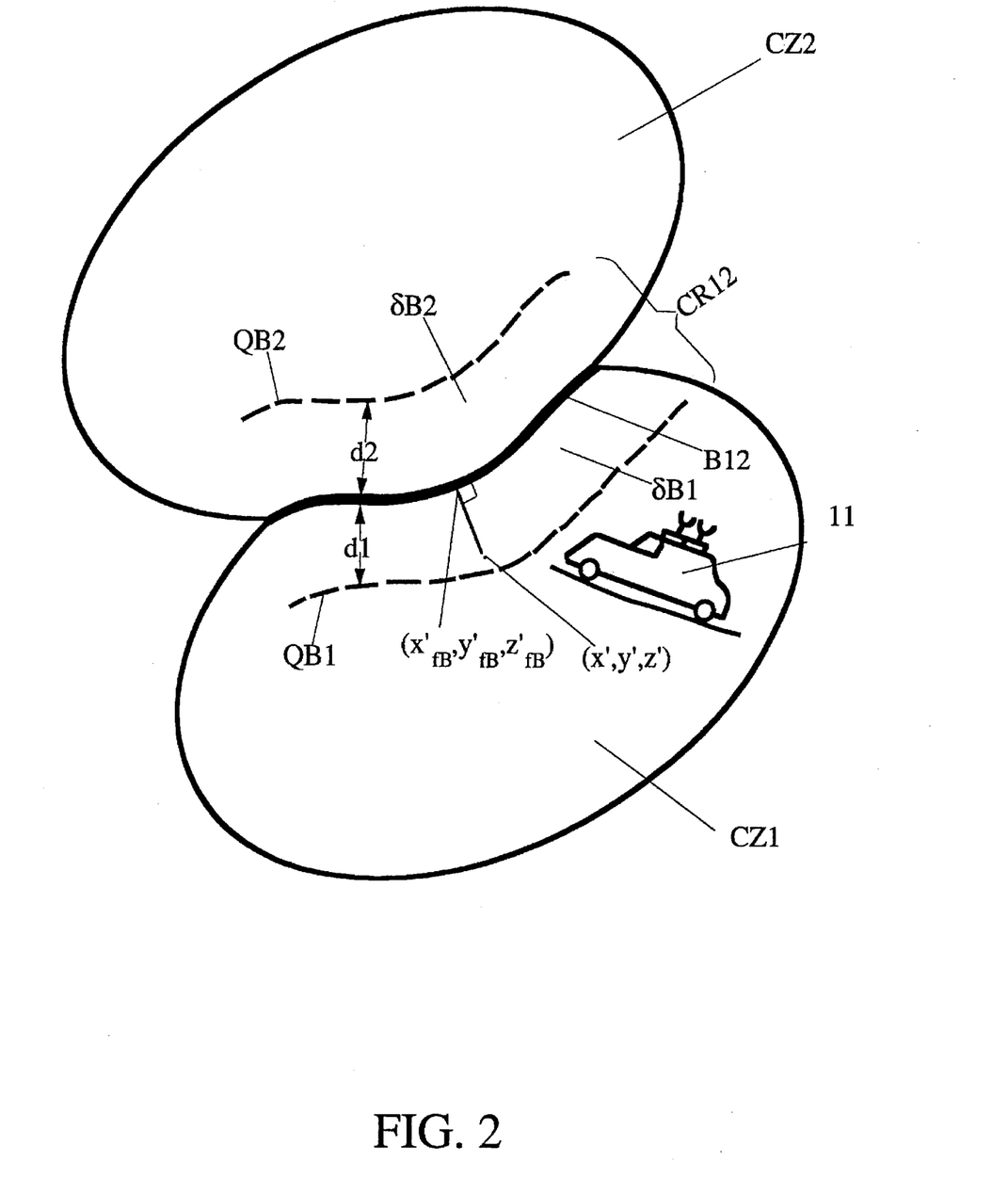
FIG. 2 illustrates some of the geometric configurations useful in determining when a vehicle crosses a cellzone boundary.

In FIG. 2, the vehicle or mobile cellphone user 11 approaches a portion of a boundary curve B12, which is preferably a closed curve that bounds a cellzone CZ1 and separates this cellzone from at least one adjacent cellzone CZ2. The cellzones CZ1 and CZ2 are preferably contiguous so that all points in a neighborhood of the boundary curve B12 belong to the cellzone CZ1, to the cellzone CZ2, or to both cellzones. The boundary curve B12 may be a single continuous or connected curve (not necessarily closed) or may be a collection of two or more continuous curve components. With the exception of points on the boundary curve B12, the cellzones CZ1 and CZ2 are preferably mutually exclusive and non-overlapping.

The boundary curve B12 is defined in the electronic map stored in the memory 33 by a collection of points in R with spatial location coordinates (x,y,z) that satisfy an equation $$h_{B12}(x_{B12}, y_{B12}, z_{B12}) = K12 \text{ (constant)}, \quad (1)$$

and the receiver/processor 15 compares the present location of the antenna 13 with this collection of boundary location coordinates at a sequence of times, using the SATPS-determined location coordinates of the antenna. The constant K12 may be zero or non-zero. Two quasi-boundary curves QB1 and QB2 are defined with reference to the boundary curve B12 and are located distances d1 and d2, respectively, from the boundary curve B12 but on opposite sides of the curve B12. The distances d1 and d2 may be the same or may be different and may each lie in a range from 10M (meters) to a few hundred M, depending in part on the sizes of the cellzones CZ1 and CZ2. The quasi-boundaries QB1 and QB2 are also defined by collections of points with spatial location coordinates $(x_{QBi}, y_{QBi}, z_{QBi})$ (i=1, 2) in the electronic map stored in the memory 33. Preferably, the distance $d_{min}$=min(d1, d2) is much less than the statistically defined $2\sigma$ inaccuracy associated with the present location coordinates of the SATPS antenna 13. The distances d1 and/or d2 can be different for boundary curves between different cellzones.

Let $\delta Bi$ denote the one-sided region between the boundary curve B12 and the quasi-boundary curve QBi (i=1, 2), which region locally has a width of di. The regions $\delta B1$ and $\delta B2$ together with the boundary curve B12 may be considered to be an overlap or common region CR12 between the contiguous cellzones CZ1 and CZ2, where each of two cellular phone service facilities can serve a cellphone user. The overlap or common region CR12 may include the regions $\delta B1$ and $\delta B2$ and the boundary curve B12. As a cellphone user moves from a non-overlap portion CZ1' (points in CZ1 but not in CR12) of the cellzone CZ1 through the common region CR12 to the non-overlap portion CZ2' (points in CZ2 but not in CR12) of the cellzone region CZ2, the cellular service facility for cellzone CZ1 will at some point hand off the responsibility for providing cellular service for thus user to the cellular service facility for the cellzone CZ2, in a well known manner.

Each point with coordinates (x,y,z) within the region $\delta Bi$ (i=1,2) has at least one "perpendicular foot" on the boundary curve B12, with coordinates $(x_{fB12}, y_{fB12}, z_{fB12})$, for which $$\min_{(x',y',z') \in B12}\{(x-x')^2+(y-y')^2+(z-z')^2\}^{1/2} = \{(x-x_{fB12})^2+(y-y_{fB12})^2+(z-z_{fB12})^2\}^{1/2}. \quad (2)$$

A perpendicular footer of a point, with spatial location coordinates (x',y',z'), on a curve B12 is a point, with spatial location coordinates $(x'',y'',z'')=(x'_{fB12}, y'_{fB12}, z'_{fB12})$ on the curve B12 such that a line drawn between the points with coordinates (x',y',z') and (x'',y'',z'') is perpendicular to the curve B12, or has the shortest distance to the curve B12, at the point of intersection (x'',y'',z'') on the curve B12. A point, such as (x',y',z'), may have one or many perpendicular footers on a given curve, such as B12, if the curve is smooth. Here, the two constraints $$h_{B12}(x,y,z) - K12 < 0, \quad (3)$$

and $$d_{fB12}(x,y,z) = \{(x-x_{fB12})^2+(y-y_{fB12})^2+(z-z_{fB12})^2\}^{1/2} < d1, \quad (4)$$

together imply that the point with location coordinates (x,y,z) lies in the interior of the region $\delta B1$; and the two constraints $$h_{B12}(x,y,z) - K12 > 0, \quad (5)$$

and $$d_{fB}(x,y,z) = [(x-x_{fB})^2+(y-y_{fB})^2+(z-z_{fB})^2]^{1/2} < d2, \quad (6)$$

together imply that the point with location coordinates (x,y,z) lies in the interior of the region $\delta B2$.

Assume, for the sake of definiteness, that the vehicle or mobile cellphone user 11, with spatial location coordinates (x(t),y(t),z(t)) that can change with increasing values of the time variable t, passes through the region $\delta B1$ before the vehicle passes across the boundary curve B12 and into the region $\delta B2$. As the vehicle 11 passes across the quasi-boundary QB 1 and into the interior of the region $\delta B1$, the receiver/processor 15 determines the present location coordinates (x(t),y(t),z(t)) of the vehicle (or of the SATPS antenna 13) and the coordinates $(x_{fB12}(t), y_{fB12}(t), z_{fB12}(t))$ of the perpendicular footer of the vehicle location on the boundary B12 and determines that these two coordinate triples satisfy Eqs. (3) and (4).

If the perpendicular footer distance $d_{fB12}(x(t),y(t),z(t))$ is decreasing with increasing values of the time variable t, the receiver/processor 15 senses that the vehicle is heading toward, and will probably cross, the boundary curve B12. In this instance, the receiver/processor readies itself for an imminent change of cellzone as the signum of the location variable $h_{B12}(x(t),y(t),z(t))-K12$ changes from negative to positive (or from positive to negative). If the perpendicular footer distance $d_{fB12}(x(t),y(t),z(t))$ is increasing with increasing values of the time variable t, the receiver/processor 15 senses that the vehicle is heading away from the boundary curve B12. In this instance, the receiver/processor 15 senses that the vehicle or mobile cellphone user 11 will not soon cross the boundary curve B12 and that no change of cellzone is imminent.

When the vehicle or mobile cellphone user 11 first crosses the quasi-boundary curve QB1 into the region $\delta B1$ from the non-overlap portion CZ1' of the cellzone CZ1 and heads toward the boundary curve B12, the SATPS receiver/processor 15 senses this development, activates the cellphone transmitter 19, and causes the cellphone transmitter to communicate this information to the first cellular service provider 20-1. The first cellular service provider 20-1 communicates this information to the second cellular telephone service provider 20-2 so that a cellular telephone service handoff to the second service provider 20-2 can be arranged. This handoff can occur at any time the vehicle of cellphone user 11 (or the SATPS antenna 13) is within the overlap or common region CR12, but it is preferable for this handoff to occur within the region $\delta B2$, after the vehicle has crossed the boundary curve B12, or near or at the boundary curve B12. The first and second service providers 20-1 and 20-2 each enter this transaction in their respective ledgers, replacing any earlier transactions involving the location of the vehicle 11: The vehicle has left the cellzone CZ1 and has subsequently entered the cellzone CZ2. Alternatively, or additionally, a central mobile cellular telephone switching office (MCTSO) 30 (FIG. 1) can be notified directly or indirectly when the vehicle 11 leaves the cellzone CZ1 and passes into the cellzone CZ2, including an indication of which cellzone the vehicle has last entered. The formalism described here extends to any two adjacent cellzones, such as CZ1 and CZ3, or CZ2 and CZ3, in FIG. 1.

If the vehicle or mobile cellphone user 11 does not subsequently leave the cellzone CZ2, and if a telephone caller later seeks to contact the cellphone in this vehicle, the central MCTSO 30 will broadcast an inquiry and will be informed by the first service provider 20-1 and/or by the second service provider 20-2 that the vehicle 11 and associated cellphone is (or is believed to be) in the cellzone CZ2. The central MCTSO 30 will then cause the telephone caller to be connected, through the second service provider 20-2, to the target cellphone in the vehicle 11 in the cellzone CZ2. Alternatively, if the central cellular station 30 has already been notified of the movement of the vehicle 11 from cellzone CZ1 to cellzone CZ2, the central MCTSO 30 can consult its own records and can determine the cellzone where the vehicle 11 is believed to be presently located.

As an additional feature, the central MCTSO 30 can maintain a log of M vehicles or mobile cellphone users, such as 11 (M a large, fixed, positive integer), most recently located by SATPS signals within the cellzones and within a selected time interval, such as $\Delta t(cache)=12$ hours. If, within the selected time interval, a selected caller seeks to reach the cellular communications device within a selected vehicle, the central MCTSO 30 first consults its cache or list of recent cellular telephone contacts and determines if this selected caller is included on its the central station's cache or list; if this target vehicle is included on the cache or list, the central MCTSO 30 uses the cellzone for this target vehicle shown by the most recent cellular telephone contact, notifies an appropriate cellzone service provider, and attempts to provide cellular communication between the selected caller and the target vehicle. Operated in this way, the list of locations of the (at most) M most recent cellphone contacts is similar to a cache operating as a separate, fast-acting memory unit in a computer. The number M of recent cellular telephone contacts in the cache or list may be made so large that the only practical limit on the number of most recent cellular telephone contacts included in the cache or list is the time interval length $\Delta t(cache)$ chosen.

Figure 3A:
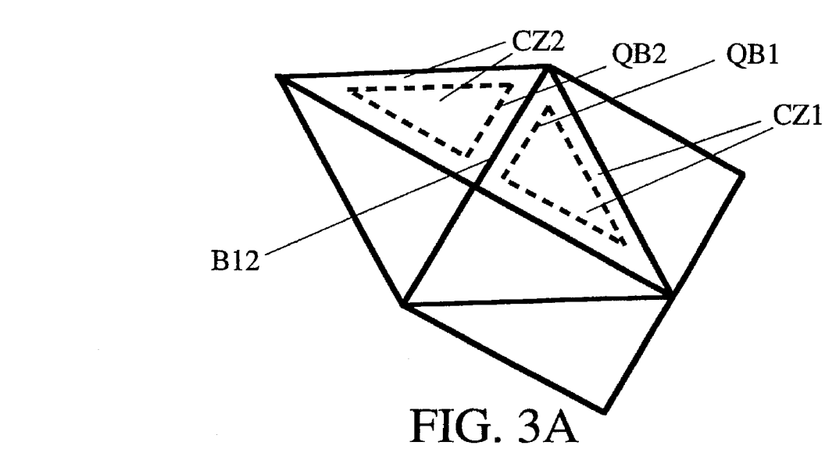
FIGS. 3A, 3B, 3C and 3D illustrate particular boundary curves and quasi-boundary curves that can be used for the invention.
Figure 3B:
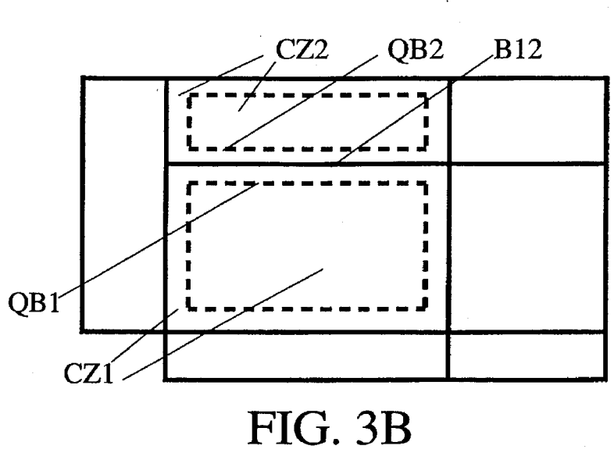
Figure 3C:
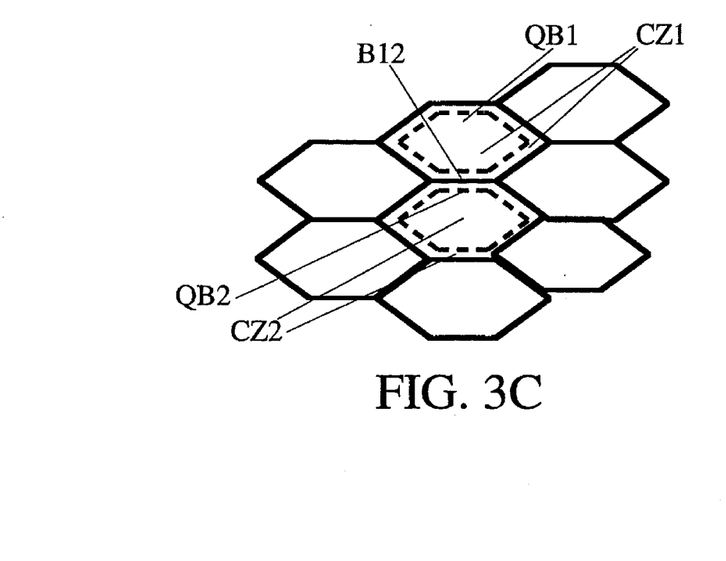

FIGS. 3A, 3B and 3C illustrate the use of regular or irregular triangles, rectangles and regular hexagons, respectively, as boundary curves B12 of cellzones in a tessellization of a region of a plane or other two-dimensional surface. Each closed dotted curve, QB1 and QB2, representing a quasi-boundary, within a cellzone thus defined can be chosen to be the same shape as the boundary curve B12 here; and the distance d between each linear segment of a quasi-boundary curve QB and the corresponding linear component of the defining boundary curve B12 is the width of that portion of the quasi-boundary region $\delta B$.

Figure 3D:
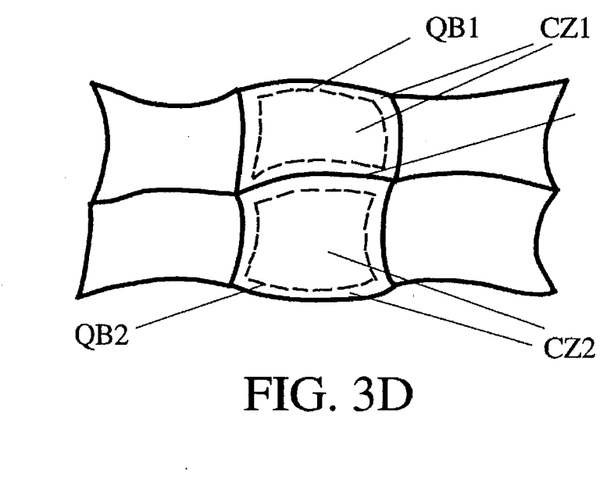

Alternatively, a region of a plane or other two-dimensional surface can be decomposed into cellzones CZi (i=1, 2, ...) by a sequence of closed curves, each of which includes one, two or more curvilinear segments. FIG. 3D illustrates use of such patterns where the curvilinear segments are portions of circles, ellipses and general ovals. More general boundary curves B12 can also be used here. Preferably, the vehicle relies on a differential SATPS to determine its present location. Differential SATPS, which is discussed below, provides greater accuracy than ordinary SATPS in location determination.

Figure 4:
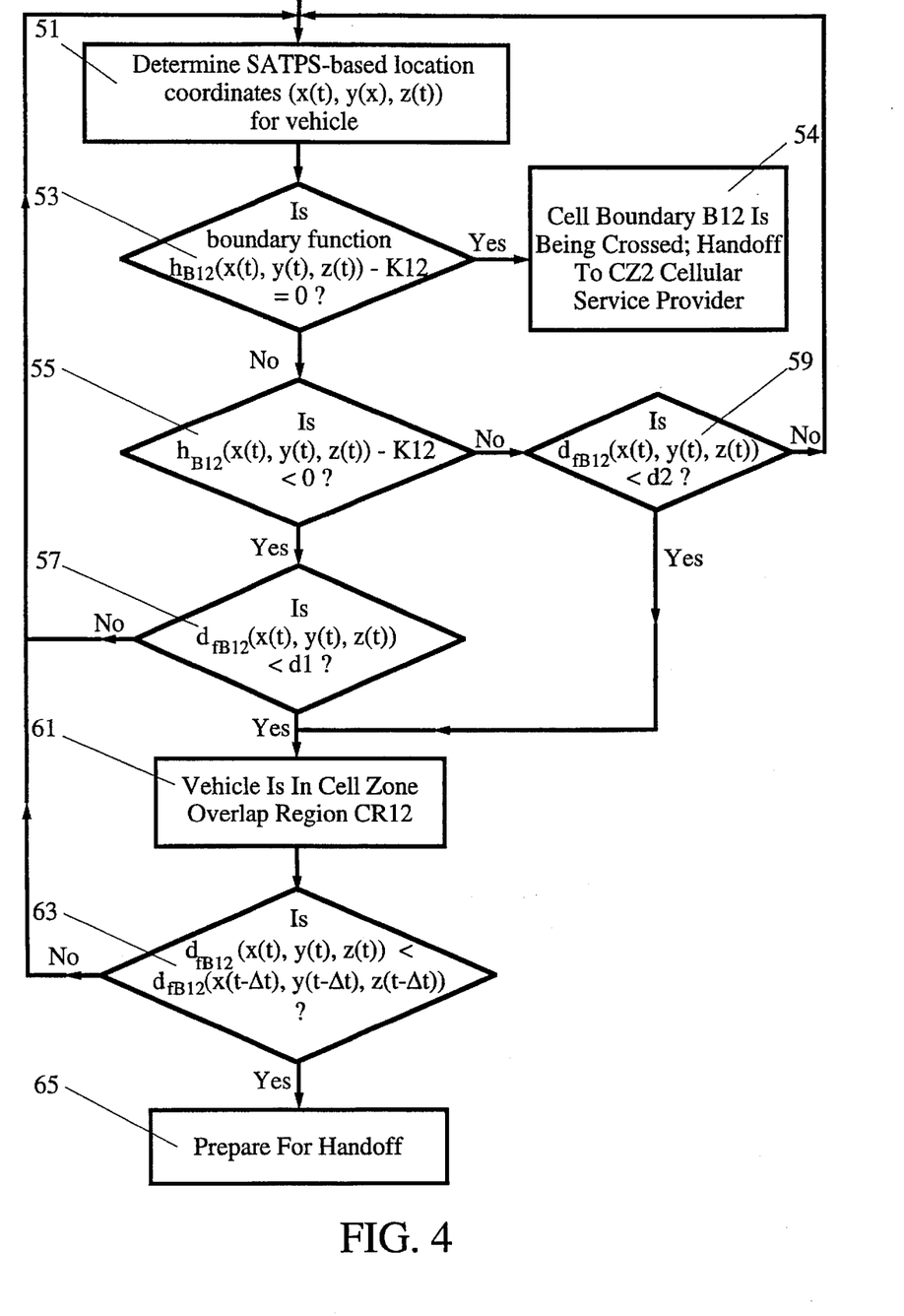
FIGS. 4 and 5 are flow charts illustrating embodiments of the invention for tracking a mobile cellular user across one or more cellzone boundaries.

FIG. 4 is a flow chart illustrating the cellzone notification procedure discussed above. In step 51, the system determines SATPS-based present location coordinates (x(t),y(t),z(t)), as a function of time t, for a cellphone user carrying cellphone/SATPS apparatus constructed and operated according to the invention. The system determines which cellzone the cellphone user is presently located in and calls up the collection of boundary curves for that cellzone. In step 53, the system determines whether a boundary function $\{h_{B12}(x(t),y(t),z(t))-K12\}$ for any boundary curve such as B12 of that cellzone for is zero (or more generally satisfies $|h_{B12}(x(t),y(t),z(t))-K12| \leq \epsilon$ for a selected small number $\epsilon$). If the answer is "yes", the system proceeds to step 54, where the system concludes that a cellzone boundary is being crossed: the cellzone indicia is changed and handoff to a cellular telephone service provider for the new cellzone is implemented.

If the answer to the question is "no", the system proceeds to step 55 and inquires if each boundary curve function $h_{B12}(x(t),y(t),z(t))-K12<0$ (or, more generally, whether $h_{B12}(x(t),y(t),z(t))-K12< -\epsilon$)? All boundary curve functions for a particular cellzone will be <0 if the vehicle is located within that cellzone.

If the answer to the question in step 55 is "yes", the system proceeds to step 57 and inquires if the perpendicular footer function $d_{fB}(x(t),y(t),z(t))$ is <d1 for the present spatial location coordinates $(x(t),y(t),z(t))$? If the answer to the question in step 57 is "yes", the system proceeds to step 61 and concludes that the cellphone user present location is in a cellzone overlap region CR12, discussed above. If the answer to the question in step 57 is "no", the system concludes that the cellphone user present location is not in a cellzone overlap region CR12 but is within the original cellzone CZ1, and the system returns to step 51 for analysis of the next present spatial location coordinates of the cellphone user.

If the answer to the question in step 55 is "no", the system concludes that $h_{B12}(x(t),y(t),z(t))-K12>0$ (or, more generally, that $h_{B12}(x(t),y(t),z(t))-K>\epsilon$) so that the cellphone user is not in the original cellzone CZ1. The system then proceeds to step 59 and inquires if the perpendicular footer distance function satisfies $d_{fB12}(x(t),y(t),z(t))<d2$? If the answer to the question in step 59 is "yes," the system proceeds to step 61 as before. If the answer to the question in step 59 is "no", the system concludes that the present location is not in a cellzone overlap region CR12 but is within an adjacent cellzone CZ2, and the system returns to step 51 for analysis of the next present location coordinates of the cellphone user.

From step 61, the system proceeds to step 63 and inquires if the perpendicular footer function $d_{fB12}(x(t),y(t),z(t))$ is less than the preceding footer function $d_{fB12}(x(t-\Delta t),y(t-\Delta t),z(t-\Delta t))$, where $\Delta t$ is a small positive time increment? If the answer to the question in step 63 is "yes", the system concludes, in step 65, that the cellphone user is approaching a cellzone boundary within a cellzone overlap region, and the system prepares for cellzone change and handoff. If the answer to the question in step 63 is "no", the system returns to the step 51. After cellzone change and handoff occurs, the system returns to step 51 and the procedure repeats. A given cellular service provider can provide cellular service for more than one cellzone.

This system is also useful if a vehicle 11 containing the cellphone is moved without authorization by the vehicle owner. If the vehicle 11 is moved across one or more cellzone boundaries, the system, unless it is disabled, will automatically notify each cellular phone service provider for a cellzone that is adjacent to a crossed boundary that the vehicle has just entered, or has just left, that cellzone. This procedure creates an electronic trail that indicates the cellzone in which the missing vehicle is presently located. Preferably, the presence of a system that automatically notifies cellular telephone service providers that a cellzone boundary is being crossed should be concealed on the vehicle so that the system is not disabled by whoever unauthorizedly moves the vehicle.

Figure 5:
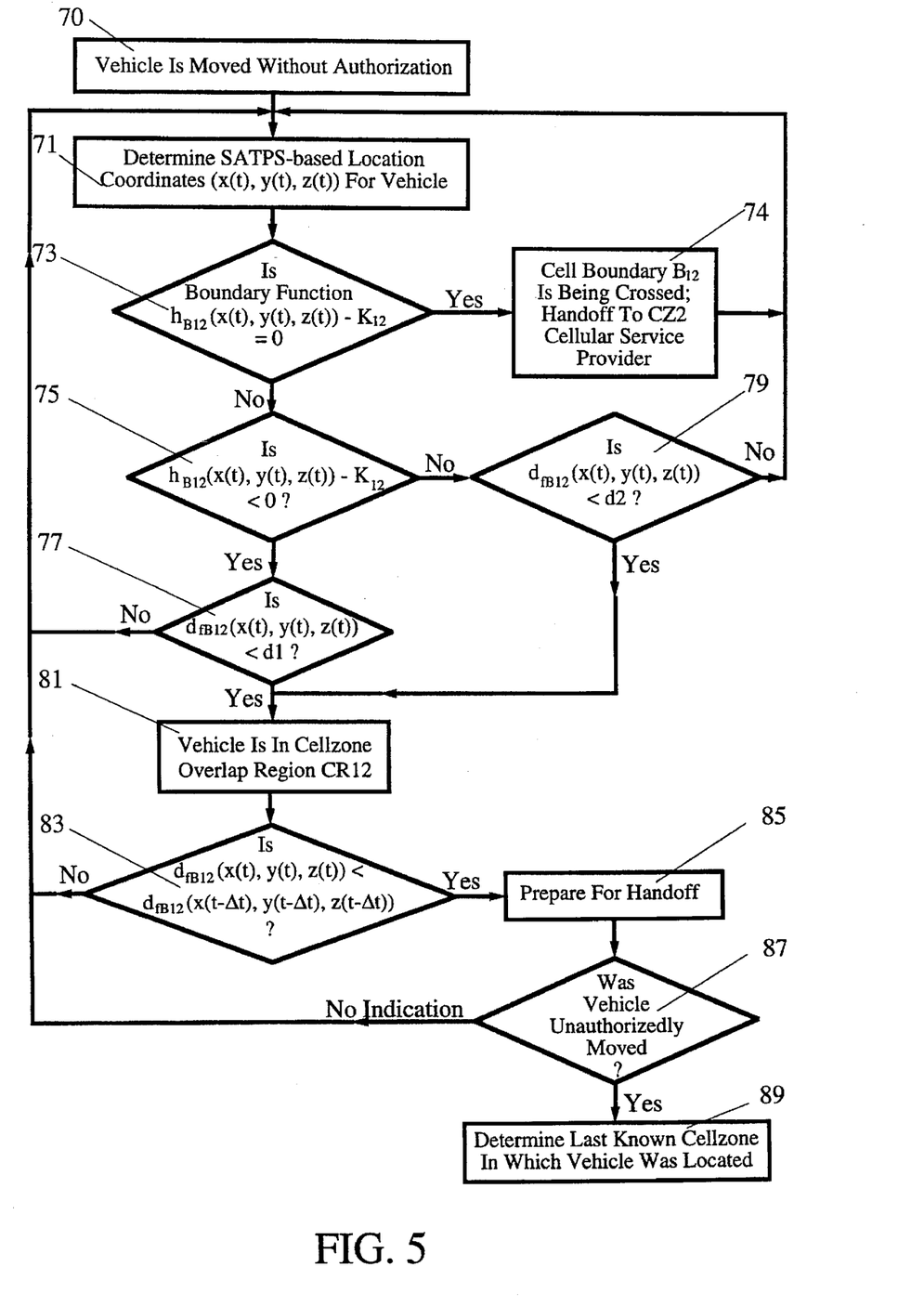

A suitable procedure for use of the invention to determine the present location of a vehicle that may have been unauthorizedly moved is illustrated in FIG. 5, most of whose steps are parallel to the steps of FIG. 4. In step 70, a vehicle is moved without the knowledge or consent of the owner. In step 71, the system automatically determines SATPS-based present location coordinates $(x(t),y(t),z(t))$, as a function of time t, for a vehicle that carries cellphone/SATPS apparatus constructed and operated according to the invention. The system determines which cellzone the vehicle is presently located in and calls up the collection of boundary curves for that cellzone. In step 73, the system determines whether a boundary function $h_{B12}(x(t),y(t),z(t))-K12$ for any boundary curve such as B12 of that cellzone for is zero (or more generally satisfies $|h_{B12}(x(t),y(t),z(t))-K12| \leq \epsilon$ for a selected small number $\epsilon$). If the answer to the question in step 73 is "yes", the system proceeds to step 74, where the system concludes that a cellzone boundary is being crossed: the cellzone indicia is changed and handoff to a cellular telephone service provider for the new cellzone is implemented.

If the answer to the question in step 73 is "no", the system proceeds to step 75 and inquires if each boundary curve function $h_{B12}(x(t),y(t),z(t))-K12<0$ (or, more generally, whether $h_{B12}(x(t),y(t),z(t))-K12< -\epsilon$)? All boundary curve functions for a particular cellzone will be <0 if the vehicle is located within that cellzone.

If the answer to the question in step 75 is "yes", the system proceeds to step 77 and inquires if the perpendicular footer function $d_{fB12}(x(t),y(t),z(t))$ is <d1 for the present spatial location coordinates $(x(t),y(t),z(t))$? If the answer to question in step 77 is "yes", the system proceeds to step 81 and concludes that the vehicle present to the question location is in a cellzone overlap region CR12, discussed above. If the answer in step 77 is "no", the system concludes that the vehicle present location is not in a cellzone overlap region CR12 but is within the original cellzone CZ1, and the system returns to step 71 for analysis of the next present spatial location coordinates of the vehicle.

If the answer to the question in step 75 is "no", the system concludes that $h_{B12}(x(t),y(t),z(t))-K12>0$ (or, more generally, that $h_{B12}(x(t),y(t),z(t))-K12>\epsilon$) so that the vehicle is not in the original cellzone CZ1. The system then proceeds to step 79 and inquires if the perpendicular footer function satisfies $d_{fB12}(x(t),y(t),z(t))<d2$? If the answer to the question in step 79 is "yes" the system proceeds to step 81 as before. If the answer to the question in step 79 is "no", the system concludes that the vehicle present location is not in a cellzone overlap region CR12 but is within an adjacent cellzone CZ2, and the system returns to step 71 for analysis of the next present location coordinates of the vehicle.

From step 81, the system proceeds to step 83 and inquires if the perpendicular footer function $d_{fB12}(x(t),y(t),z(t))$ is less than the preceding footer function $d_{fB12}(x(t-\Delta t),y(t-\Delta t),z(t-\Delta t))$, where $\Delta t$ is a small positive time increment? If the answer to the question in step 83 is "yes", the system concludes, in step 85, that the vehicle is approaching a cellzone boundary with a cellzone overlap region, and the system prepares for cellzone change and handoff. If the answer to the question in step 83 is "no", the system returns to step 71.

This procedure continues until the vehicle owner (or owner's representative) realizes that the vehicle has been moved without authorization and attempts to determine where the vehicle is presently located. In step 87, the vehicle owner contacts the central MCTSO 30 or other cellular service station and inquires about the present location of the missing vehicle. In step 89, the owner is informed that the vehicle location was last reported in a specified cellzone (e.g., CZ1 or CZ2 or CZ3), and the owner takes action to recover possession of the vehicle. While the owners' request for information on the present location of the missing vehicle is being processed, the central station keeps a present account of the cellzone in which the vehicle is presently located.

If the present spatial location of the vehicle needs to be determined with greater accuracy, the cellular phone plus GPS system disclosed in U.S. patent application Ser. No.

07/978,272 (now U.S. Pat. No. 5,418,537), entitled "Location Of Missing Vehicles" and assigned to the assignee of this application, can be used.

Figure 6:
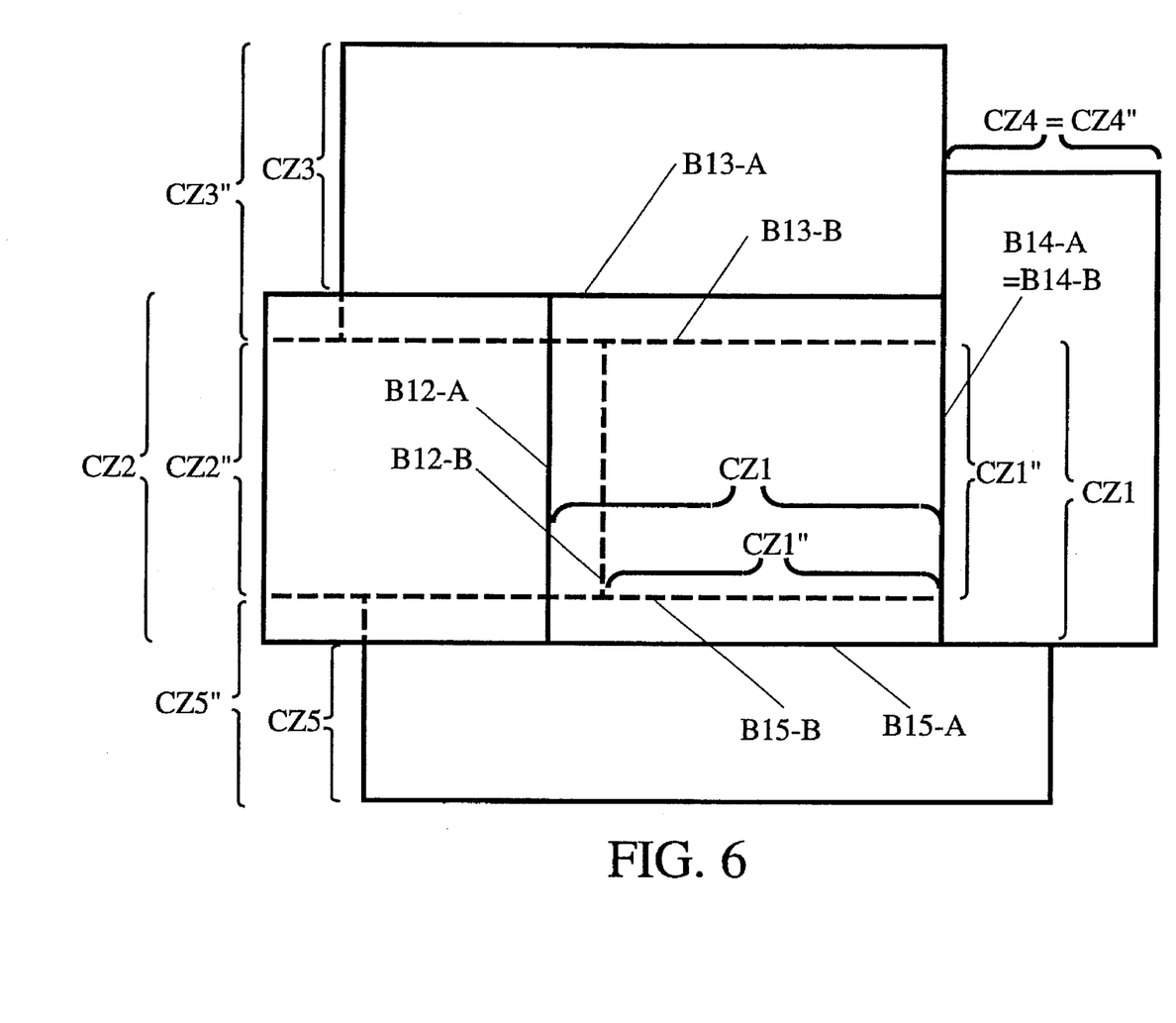
FIG. 6 illustrates use of two alternate sets of boundary curves defining a given cellzone.

If the cellular phone service provider in a target cellzone is currently overloaded with demand for cellular phone service so that the channels are collectively saturated, the boundary curves for the target cellzone can be changed to reduce the area covered by the target cellzone and to partly equalize the load on these cellzones. This usually requires prior negotiation or arrangement with the cellular service providers for cellzones that are contiguous with the target cellzone. Boundary curve collections for a first definition {B12-A, B13-A, B14-A, B15-A} and a second (distinct) definition {B12-B, B13-B, B14-B, B15-B} of the boundary between a a cellzone CZ1 and adjacent cellzones CZ2, CZ3, CZ4 and CZ5 in a region R can be included as alternative electronic maps, as illustrated in FIG. 6. Here, for simplicity of illustration, all the cellzone shapes are shown as rectangles. However, the shape of each of the cellzones can be chosen independently, as long as the cellzones in any definition fit together appropriately.

In an exchange of one electronic map for another, a boundary curve for at least two adjacent cellzones is changed to reduce the geographical area covered by at least one of these cellzones. In most instances, if the boundary curve B12 between cellzones CZ1 and CZ2 is changed to produce new or alterative cellzones CZ1"and CZ2", one of original cellzones, such as CZ1, will properly contain the corresponding alternative cellzone CZ1', and another alternative cellzone, such as CZ2", will properly contain the corresponding original cellzone CZ2. A cellzone CZ1" is properly contained in a cellzone CZ1 if the cellzone CZ1 contains all points in CZ1" and contains at least one point not in CZ1".

If cellzone CZ1, whose geographical extent is defined by the boundary curves B12-A, B13-A, B14-A and B15-A in a first electronic map, is found to be in a severe cellular service overload condition, and if the adjacent cellzones CZ2, CZ3, CZ4 and CZ5 are not overloaded, or are not overloaded as severely, the central MCTSO 30 or another cellzone boundary authority notifies the cellular service providers that the boundary curves B12-A, B13-A, B14-A and B15-A are being temporarily replaced by the respective boundary curves B12-B, B13-B, B14-B and B15-B in a second electronic map, in order to (partly) relieve the overload condition extant in cellzone CZ1. This replacement is preferably implemented by replacing the first electronic map by the second electronic map. After this replacement, the cellzone CZ1 has a smaller geographical area and, it is assumed, has fewer mobile cellular units to service within a new or alternative cellzone CZ1". One or more of the the adjacent new or alternative cellzones CZ2", CZ3", CZ4" and CZ5" will acquire additional mobile cellular units to service, as a result of this replacement.

Each of these cellzones then notifies all mobile cellular units presently in any of these cellzones, and any mobile cellular unit that subsequently enters any of these cellzones, that, until further notice, the boundary curves that define the cellzones CZ1, CZ2, CZ3, CZ4 and CZ5 no longer include the boundary curves B12-A, B13-A, B14-A and/or B15-A but include instead the respective boundary curves B12-B, B13-B, B14-B and/or B15-B. Preferably, this notification is implemented by advising such mobile cellular units to replace the first electronic map (A) by the second electronic map (B). Each mobile cellular unit has the electronic map A and the electronic map B in the database of its SATPS receiver/processor or microprocessor or CPU so that this change of boundary curves can be made quickly and efficiently. Optionally, each cellzone, such as CZ1, has at least three electronic maps, each containing a set of alternate boundary curves that define that cellzone: a first set, for use in normal operations; a second set, for use when that cellzone CZ1 experiences a severe service overload condition; and a third set, for use where an adjacent cellzone experiences a severe cellular service overload condition that is not also experienced by the cellzone CZ1. Preferably, each set of boundary curves has its corresponding set of quasi-boundary curves, as illustrated in FIGS. 2 and 3A–3D. The cellzone boundary curves can be moved back and forth dynamically or "on the fly" as overload conditions develop and are relieved in various cellzones.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational System.

The Global Positioning System (GPS) is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiples f1=1540 f0 and f2=1200 f0 of a base frequency f0=1.023 MHz. The L1 signal from each satellite is binary phase shift key (BPSK) modulated by two pseudo-random noise (PRN) codes in phase quadrature, designated as the C/A-code and P-code. The L2 signal from each satellite is BPSK-modulated by only the P-code. The nature of these PRN codes is described below.

One motivation for use of two carrier signals L1 and L2 is to allow partial compensation for propagation delay of such a signal through the ionosphere, which delay varies approximately as the inverse square of signal frequency f (delayoc $f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, 3 Jul. 1991.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, The NAVSTAR Global Positioning System, Van Nostrand Reinhold, N.Y., 1992.

A second configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602+9 k/16) GHz and f2=(1.246+7 k/16) GHz, where k(=0, 1, 2, . . . , 23) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate–5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential SATPS positioning, is far more accurate than absolute positioning, provided that the distances between these stations are substantially less than the distances from these stations to the satellites, which is the usual case. Differential SATPS positioning can be used for survey or construction work in the field, providing location coordinates and distances that are accurate to within a few centimeters.

In differential SATPS position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon in *The NAVSTAR Global Positioning System*, Van Nostrand Reinhold, 1992, pp. 33–90.

I claim:

1. A method for providing handoff between at least two cellzones for a mobile cellphone user, the method comprising the steps of:

provi­ding a cellphone user with a cellular telephone that can communicate with a selected telephone through a first cellular telephone service provider, when the cellular telephone is located within a first cellzone, and can communicate with the selected telephone through a second cellular telephone service provider, when the cellular telephone is located within a second cellzone that is adjacent to the first cellzone;

providing the cellphone user with a Satellite Positioning System (SATPS) antenna and SATPS receiver/processor and with a transmitter, to receive SATPS signals from a plurality of SATPS satellites, to determine the present location of the SATPS antenna from analysis of these SATPS signals, and to transmit information on the present location of the SATPS antenna to a cellular telephone service provider for a cellzone in which the antenna is presently located;

providing the cellphone user with a microprocessor and associated memory, connected to the cellular telephone and to the SATPS receiver/processor, that contains an electronic map of at least the first and second cellzones;

providing a cellzone boundary curve B12 between the first and second cellzones, where B12 is defined on the electronic map by an equation $h_{B12}(x_{B12}, y_{B12}, z_{B12})=0$, where $(x_{B12}, y_{B12}, z_{B12})$ are the spatial location coordinates of a point lying on the boundary curve B12, where the equation $h_{B12}(x,y,z)<0$ indicates that a point with coordinates (x,y,z) is within a first region including the first cellzone and not including the second cellzone, and where the equation $h_{B12}(x,y,z)>0$ indicates that the point with coordinates (x,y,z) is within a second region including the second cellzone and not including the first cellzone;

providing a first quasi-boundary curve QB1 within the first cellzone that is defined on the map by a curve of points with coordinates $(x_{QB1},y_{QB1},z_{QB1})$ within the first cellzone for which the perpendicular footer distance $d_{fB12}(x,y,z)$ of each point $(x_{QB1},y_{QB1},z_{QB1})$ on the curve QB1 to its perpendicular footer on the curve B12 satisfies the relation $d_{fB12}(x_{QB1},y_{QB1},z_{QB1})=d1$, where d1 is a selected positive distance;

providing a second quasi-boundary curve QB2 within the second cellzone that is defined on the map by a curve of points with coordinates $(x_{QB2},y_{QB2},z_{QB2})$ within the second cellzone for which the perpendicular footer distance $d_{fB12}(x,y,z)$ of each point $(x_{QB2},y_{QB2},z_{QB2})$ on the curve QB2 to its perpendicular footer on the curve B12 satisfies the relation $d_{fB12}(x_{QB2},y_{QB2},z_{QB2})=d2$, where d2 is a selected positive distance;

defining a region CR12 of points lying between the first quasi-boundary curve QB1 and the second quasi-boundary curve QB2, including at least a portion of the boundary curve B12;

when the SATPS antenna is within at least one of the first cellzone and the second cellzone, determining the antenna's spatial location coordinates (x(t),y(t),z(t)), which may vary with time t;

determining whether the SATPS antenna's spatial location coordinates satisfy the two relations $h_{B12}(x(t),y(t),z(t))<0$ and $d_{fB12}(x(t),y(t),z(t))\geq d1$, and when these two relations are both satisfied, determining that the cellphone user is presently in the first cellzone;

when the SATPS antenna is within the first cellzone and not within the region CR12, providing cellular telephone service for the cellphone user with the first cellular telephone service provider;

determining whether the SATPS antenna's spatial location coordinates satisfy the two relations $h_{B12}(x(t),y(t),z(t))<0$ and $d_{fB12}(x(t),y(t),z(t))<d1$, and when these two relations are both satisfied and the distance $d_{fB12}(x(t),y(t),z(t))$ is decreasing with increasing time t, notifying at least one of the first and second cellular telephone service providers that the cellphone user will soon pass from the first cellzone into the second cellzone; and determining whether the SATPS antenna's spatial location coordinates satisfy the relation $h_{B12}(x(t),y(t),z(t))>0$, and when this relation is satisfied and the distance $d_{fB12}(x(t),y(t),z(t))$ is increasing with increasing time t, notifying at least one of the first and second cellular telephone service providers that the cellphone user has passed from the first cellzone into the second cellzone.

2. The method of claim 1, further comprising the steps of:
when said SATPS antenna is within said second cellzone and not within said region CR12, (1) providing cellular telephone service for said cellphone user with said second cellular telephone service provider, and (2) communicating with a cellular telephone switching office and advising the office that cellular telephone service is now provided by said second cellular telephone service provider.

3. The method of claim 1, further comprising the step of:
when said SATPS antenna is within said first cellzone and not within said region CR12, (1) providing cellular telephone service for said cellphone user with said first cellular telephone service provider, and (2) communicating with a cellular telephone switching office and advising the office that cellular telephone service is now provided by said first cellular telephone service provider.

4. The method of claim 1, further comprising the step of:
when said SATPS antenna's spatial location coordinates satisfy the relations $h_{B12}(x(t),y(t),z(t))<0$ and $d_{fB12}(x(t),y(t),z(t))<d1$ and the distance $d_{fB12}(x(t),y(t),z(t))$ is decreasing with increasing time t, causing said second cellular telephone service provider to begin providing cellular telephone service for said cellphone user.

5. The method of claim 1, further comprising the step of:
determining whether said SATPS antenna's spatial location coordinates satisfy the two relations $h_{B12}(x(t),y(t),z(t))<0$ and $d_{fB12}(x(t),y(t),z(t))<d1$, and when these two relations are both satisfied and the distance $d_{fB12}(x(t),y(t),z(t))$ is increasing with increasing time t, determining that the cellphone user will not soon pass from the first cellzone into the second cellzone.

6. The method of claim 1, wherein said step of providing said cellzone boundary curve B12 comprises the step of choosing said boundary curve B12 to be at least a portion of a curve drawn from the class of closed curves consisting of a triangle, a rectangle and a hexagon.

7. The method of claim 1, wherein said step of providing said cellzone boundary curve B12 comprises the step of choosing said boundary curve B12 to be at least a portion of a curve drawn from the class of closed curves consisting of a circle, an ellipse and an oval.

8. The method of claim 1, further comprising the step of allowing said cellphone user to communicate with a selected telephone user using said first cellular telephone service provider, when said cellphone user is determined to be within said first cellzone.

9. The method of claim 1, further comprising the step of allowing said cellphone user to communicate with a selected telephone user using said second cellular telephone service provider, when said cellphone user is determined to be within said second cellzone.

10. The method of claim 1, further comprising the steps of:
providing a second electronic map containing a second cellzone boundary curve B12' between a first alternative first cellzone and an alternative second cellzone, where the first alternative first cellzone is properly contained in said first cellzone and said second cellzone is properly contained in the alternative second cellzone, where B12' is defined on the second electronic map by an equation $h_{B12'}(x_{B12},y_{B12},z_{B12})=0$, where $(x_{B12},y_{B12},z_{B12})$ are the spatial location coordinates of a point lying on the boundary curve B12', where the equation $h_{B12'}(x,y,z)<0$ indicates that a point with coordinates (x,y,z) is within a third region including the first alternative first cellzone and not including the alternative second cellzone, and where the equation $h_{B12'}(x,y,z)>0$ indicates that the point with coordinates (x,y,z) is within a fourth region including the alternative second cellzone and not including the first alternative first cellzone; and when said first cellular service provider is determined to be overloaded with demands for cellular communications service, changing said first cellzone and said second cellzone boundary curves according to the following procedure:
replacing said first electronic map, containing said first cellzone and said second cellzone, by the second electronic map, containing the first alternative first cellzone and the alternative second cellzone, respectively.

11. The method of claim 1, further comprising the step of:

recording an estimated time and said cellzone that said SATPS antenna is entering ("destination cellzone"), for at least one time that said SATPS antenna crosses said cellzone boundary.

12. The method of claim 11, further comprising the step of:

when a telephone caller seeks to contact said cellphone user, consulting a list of said recorded times of cellzone boundary crossings and destination cellzones to determine at least one of (1) said destination cellzone, if any, that said cellphone user has most recently entered and (2) said estimated time, if any, that said cellphone user has most recently entered said destination cellzone.

13. A method for tracking and providing information on the present location of a missing vehicle, the method comprising the steps of:

providing a vehicle with a cellular telephone that can communicate with a selected telephone through a first cellular telephone service provider, when the cellular telephone is located within a first cellzone and can communicate with the selected telephone through a second cellular telephone service provider, when the cellular telephone is located within a second cellzone that is adjacent to the first cellzone, where the first and second cellular telephone service providers may be the same and may be different;

providing the vehicle with a Satellite Positioning System (SATPS) antenna and SATPS receiver/processor and with a transmitter, to receive SATPS signals from a plurality of SATPS satellites, to determine the present location of the SATPS antenna from analysis of these SATPS signals, and to transmit information on the present location of the SATPS antenna to a cellular telephone service provider for a cellzone in which the antenna is presently located;

when the vehicle is determined to be missing, communicating with at least one cellular service provider to determine the cellzone in which the vehicle was last known to be located, using information obtained from a cellular telephone service provider for a cellzone and from the SATPS signals; and determining that the approximate present location of the missing vehicle is in the cellzone in which the vehicle was last known to be located;

where the steps of determining the present location of the SATPS antenna and transmitting information on the present location of the antenna comprise the steps of:

providing the vehicle with a microprocessor and associated memory, connected to the cellular telephone and to the receiver/processor, that contains an electronic map of at least the first and second cellzones;

providing a cellzone boundary curve B12 between the first and second cellzones, where B12 is defined on the map by an equation $h_{B12}(x_{B12}, y_{B12}, z_{B12})=0$, where $(x_{B12}, y_{B12}, z_{B12})$ are the spatial location coordinates of a point lying on the boundary curve B12, where the equation $h_{B12}(x,y,z)<0$ indicates that a point with coordinates (x,y,z) is within a first region including the first cellzone and not including the second cellzone, and where the equation $h_{B12}(x,y,z)>0$ indicates that the point with coordinates (x,y,z) is within a second region including the second cellzone and not including the first cellzone;

providing a first quasi-boundary curve QB1 within the first cellzone that is defined on the map by a curve of points with coordinates $(x_{QB1}, y_{QB1}, z_{QB1})$ within the first cellzone for which the perpendicular footer distance $d_{fB12}(x,y,z)$ of each point $(x_{QB1}, y_{QB1}, z_{QB1})$ on the curve QB1 to its perpendicular footer on the curve B12 satisfies the relation $d_{fB12}(x_{QB1}, y_{QB1}, z_{QB1})=d1$, where d1 is a selected distance;

providing a second quasi-boundary curve QB2 within the second cellzone that is defined on the map by a curve of points with coordinates $(x_{QB2}, y_{QB2}, z_{QB2})$ within the second cellzone for which the perpendicular footer distance $d_{fB12}(x,y,z)$ of each point $(x_{QB2}, y_{QB2}, z_{QB2})$ on the curve QB2 to its perpendicular footer on the curve B12 satisfies the relation $d_{fB12}(x_{QB2}, y_{QB2}, z_{QB2})=d2$, where d2 is a selected distance;

defining a region CR12 of points lying between the first quasi-boundary curve QB1 and the second quasi-boundary curve QB2, including the boundary curve B12;

when the SATPS antenna is within at least one of the first cellzone and the second cellzone, determining the antenna's spatial location coordinates (x(t),y(t), z(t)), which may vary with time t;

determining whether the SATPS antenna's spatial location coordinates satisfy the two relations $h_{B12}(x(t),y(t),z(t))-K12<0$ and $d_{fB12}(x(t),y(t),z(t))-\geq d1$, and when these two relations are both satisfied, determining that the vehicle is presently in the first cellzone;

when the antenna is within the first cellzone and not within the region CR12, providing cellular telephone service for the vehicle cellular phone with the first cellular telephone service provider;

determining whether the antenna's spatial location coordinates satisfy the two relations $h_{B12}(x(t),y(t),z(t))<0$ and $d_{fB12}(x(t),y(t),z(t))<d1$, and when these two relations are both satisfied and the distance $d_{fB12}(x(t),y(t),z(t))$ is decreasing with increasing time t, notifying at least one of the first and second cellular telephone service providers that the vehicle will soon pass from the first cellzone into the second cellzone;

determining whether the SATPS antenna's spatial location coordinates satisfy the two relations $h_{B12}(x(t),y(t),z(t))>0$ and $d_{fB}(x(t),y(t),z(t))<d2$, and when these two relations are both satisfied and the distance $d_{fB12}(x(t),y(t),z(t))$ is increasing with increasing time t, notifying at least one of the first and second cellular telephone service providers that the vehicle has passed from the first cellzone into the second cellzone; and when at least one of the first and second cellular service providers is communicated with by a cellular telephone switching office, advising the switching office of the cellzone in which the vehicle was last known to be located.

14. The method of claim 13, wherein said step of providing said cellzone boundary curve B12 comprises the step of choosing said boundary curve B12 to be at least a portion of a curve drawn from the class of closed curves consisting of a triangle, a rectangle and a hexagon.

15. The method of claim 13, wherein said step of providing said cellzone boundary curve B12 comprises the step of choosing said boundary curve B12 to be at least a portion of a curve drawn from the class of closed curves consisting of a circle, an ellipse and an oval.

16. A method for providing flexible cellular service to a region, the method comprising the steps of:

provided a cellphone user with a cellular telephone that can communicate with a selected telephone through a first cellular telephone service provider, when the cellular telephone is located within a first cellzone, and can communicate with the selected telephone through a second cellular telephone service provider, when the cellular telephone is located within a second cellzone that is adjacent to the first cellzone, where the first and second cellular telephone service providers may be the same and may be different;

providing the vehicle with a Satellite Positioning System (SATPS) antenna and SATPS receiver/processor and with a transmitter, to receive SATPS signals from a plurality of SATPS satellites, to determine the present location of the SATPS antenna from analysis of these SATPS signals, and to transmit information on the present location of the SATPS antenna to a cellular telephone service provider for a cellzone in which the antenna is presently located;

providing the vehicle with a microprocessor and associated memory, connected to the cellular telephone and to the receiver/processor, that contains at least first and second electronic maps of the combined first and second cellzones;

providing a first electronic map containing a first cellzone boundary curve B12 between the first and second cellzones, where B12 is defined on the map by an equation $h_{B12}(x_{B12}, y_{B12}, z_{B12}) = 0$, where $(x_{B12}, y_{B12}, z_{B12})$ are the spatial location coordinates of a point lying on the boundary curve B12, where the equation $h_{B12}(x,y,z) < 0$ indicates that a point with coordinates $(x,y,z)$ is within a first region including the first cellzone and not including the second cellzone, and where the equation $h_{B12}(x,y,z) > 0$ indicates that the point with coordinates $(x,y,z)$ is within a second region including the second cellzone and not including the first cellzone;

providing a second electronic map containing a second cellzone boundary curve B12' between an alternative first cellzone and an alternative second cellzone, where the alternative first cellzone is properly contained in the first cellzone and the second cellzone is properly contained in the alternative second cellzone, where B12' is defined on the second electronic map by an equation $h_{B12'}(x_{B12}, y_{B12}, z_{B12}) = 0$, where $(x_{B12}, y_{B12}, z_{B12})$ are the spatial location coordinates of a point lying on the boundary curve B12', where the equation $h_{B12'}(x,y,z) < 0$ indicates that a point with coordinates $(x,y,z)$ is within a third region including the alternative first cellzone and not including the alternative second cellzone, and where the equation $h_{B12'}(x,y,z) > 0$ indicates that the point with coordinates $(x,y,z)$ is within a fourth region including the alternative second cellzone and not including the alternative first cellzone;

causing the first and second cellular telephone service providers to provide cellular telephone service within the first cellzone and within the second cellzone, respectively;

when the first cellular service provider is determined to be overloaded with demands for cellular communications service, replacing the first electronic map, containing the first cellzone and the second cellzone, by the second electronic map, containing the alternative first cellzone and the alternative second cellzone; and causing the first and second cellular telephone service providers to provide cellular telephone service within the alternative first cellzone, and within the alternative second cellzone, respectively.

17. The method of claim 16, wherein said step of providing said cellzone boundary curve B12 comprises the step of choosing said boundary curve B12 to be at least a portion of a curve drawn from the class of closed curves consisting of a triangle, a rectangle and a hexagon.

18. The method of claim 16, wherein said step of providing said cellzone boundary curve B12 comprises the step of choosing said boundary curve B12 to be at least a portion of a curve drawn from the class of closed curves consisting of a circle, an ellipse and an oval.

19. A method for providing handoff between at least two cellzones for a mobile cellphone user, the method comprising the steps of:

determining location coordinates of a cellphone used by a cellphone user;

comparing the cellphone location coordinates with a cellzone map, and identifying a first cellzone on the cellzone map in which the cellphone is presently located, where the first cellzone is adjacent to a second cellzone, and the first cellzone and the second cellzone are separated by a cellzone boundary;

providing cellphone service for the cellphone by a cellphone service provider located within the first cellzone, when the cellphone location is within the first cellzone;

determining a distance d of the cellphone from the cellzone boundary, when the cellphone location is determined to be within the first cellzone;

when the distance d is less than a selected positive distance d1 and is decreasing with increasing time, and the cellphone location is within the first cellzone, preparing to hand off cellphone service for the cellphone to the cellphone service provider for the second cellzone; and when the cellphone location is determined to have passed across the cellzone boundary, providing cellphone service for the cellphone by a cellphone service provider located within the second cellzone, when the cellphone location is within the second cellzone.

20. The method of claim 19, where said step of determining said cellphone location coordinates comprises the step of:

receiving Satellite Positioning System (SATPS) signals from a plurality of SATPS satellites at an SATPS signal antenna and receiver/processor that is connected to said cellphone and that determines present location of the SATPS antenna from analysis of the SATPS signals; and transmitting information on the present location of the SATPS antenna to at least one of said cellphone service provider for said first cellzone and said cellphone service provider for said second cellzone.

21. A method for providing handoff between at least two cellzones for a mobile cellphone user, the method comprising the steps of:

determining location coordinates of a cellphone used by a cellphone user;

comparing the cellphone location coordinates with a cellzone map, and identifying a first cellzone on the cellzone map in which the cellphone is presently located, where the first cellzone is adjacent to a second cellzone, and the first cellzone and the second cellzone are separated by a cellzone boundary;

providing cellphone service for the cellphone by a cellphone service provider located within the first cellzone, when the cellphone location is within the first cellzone;

determining a distance d of the cellphone from the cellzone boundary, when the cellphone location is determined to be within the first cellzone;

when the distance d is less than a selected positive distance d1 and is increasing with increasing time, and the cellphone location is within the first cellzone, providing cellphone service for the cellphone by the cellphone service provider for the first cellzone; and when the cellphone location is determined to have passed across the cellzone boundary, providing cellphone service for the cellphone by a cellphone service provider located within the second cellzone, when the cellphone location is within the second cellzone.

22. The method of claim 21, where said step of determining said cellphone location coordinates comprises the step of:

receiving Satellite Positioning System (SATPS) signals from a plurality of SATPS satellites at an SATPS signal antenna and receiver/processor that is connected to said cellphone and that determines present location of the SATPS antenna from analysis of the SATPS signals; and transmitting information on the present location of the SATPS antenna to at least one of said cellphone service provider for said first cellzone and said cellphone service provider for said second cellzone.

\* \* \* \* \*